INVENTOR
EDWARD FRANCIS DANIEL WEBB

ATTORNEYS 3,205,421
ELECTRIC SERVO MOTORS
Edward Francis Daniel Webb, 367 Finchampstead Road,
Wokingham, England
Filed May 9, 1961, Ser. No. 108,828
Claims priority, application Great Britain, May 16, 1960,
17,296/60
8 Claims. (Cl. 318—197)

This invention relates to electric motors.

It is an object of the present invention to provide a variable speed electric motor which is operable from a polyphase alternating current supply, and which is of the kind which dispenses with commutators and/or brush gear.

The speed of a polyphase induction motor is variable within limits by the introduction of an electromotive force into the rotor windings of the motor in a direction which is in opposition to the electromotive force induced in the rotor windings from the stator windings, thereby causing the slip of the rotor to increase and in consequence increasing the electromotive force induced in the rotor until it can exceed the counterelectromotive force by the required amount.

It has been found that such motors incorporating the above-mentioned method of speed control have hitherto suffered from either excessive heat losses in external resistances or has necessitated the use of commutators, brush gear and induction regulators, with the resulting increase cost, bulk and maintenance problems in the running of the motor.

It is a further object of the present invention to provide an electric motor which has a high sensitivity to changes in the controlling signal and which is capable of controlling heavy loads. Such motors are of wide utility particularly in automatic control systems wherein it is required to manipulate control means for the purposes of providing modulation in the flow of liquids, solids (granular or pulverised) in accordance with the dictates of an automatic control unit or system and where such modulation is preferably by variation in speed of the means of transportation i.e. pumps, fans etc. In such applications it is essential that the operation of the controlled element is such that the adjustments of the element are accurate and are maintained within very closely predetermined limits.

Broadly, according to one aspect of the present invention an electric motor includes a polyphase stator winding, a polyphase rotor winding one end of each phase winding of which being star connected and the other end of each phase winding being separately connected to one terminal of a full wave rectifier network mounted to rotate with the rotor, a second rotor having a second polyphase winding one end of each of the phase windings thereof being star connected and the other ends connected to corresponding terminals of the rectifier networks, the second rotor being located adjacent to and coaxial with the first rotor and constrained to rotate therewith. The second stator winding comprises a single field winding.

Figure 1:
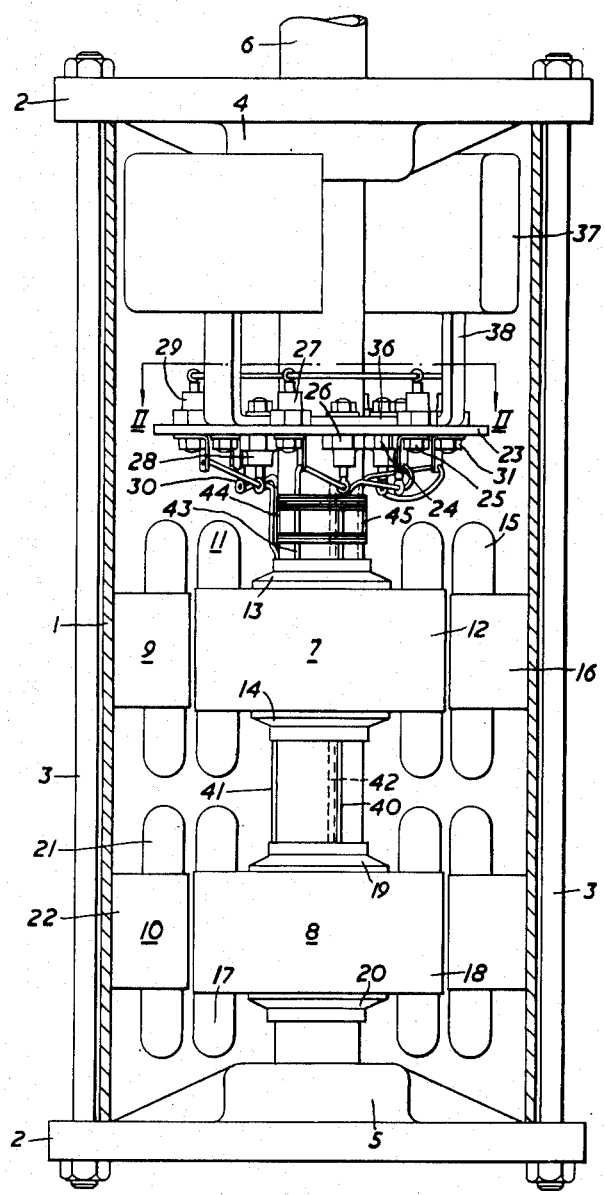
Figure 2:
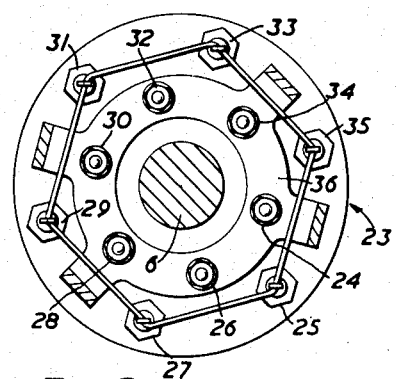
Figure 4:
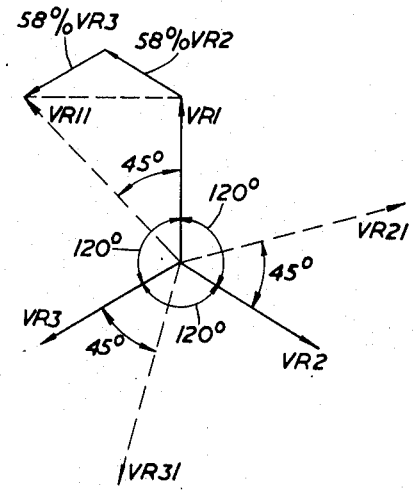
Figure 3:
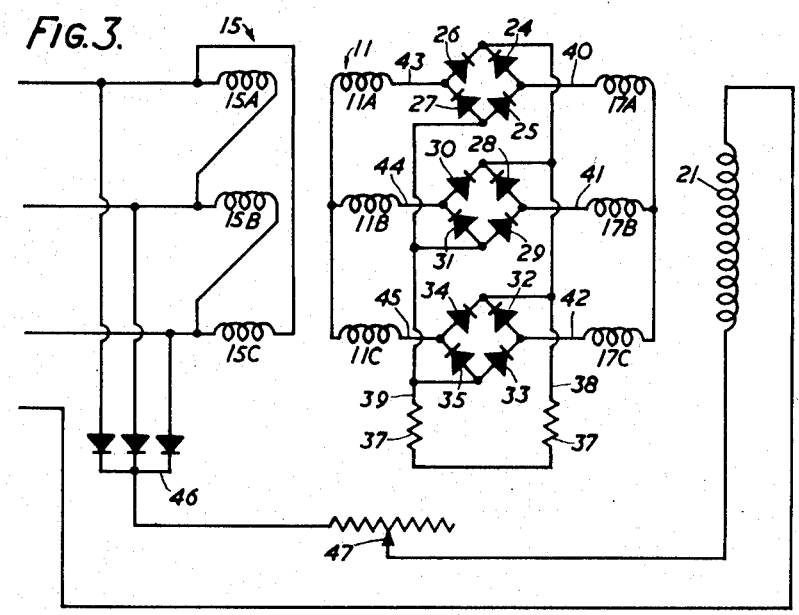
Figure 5:
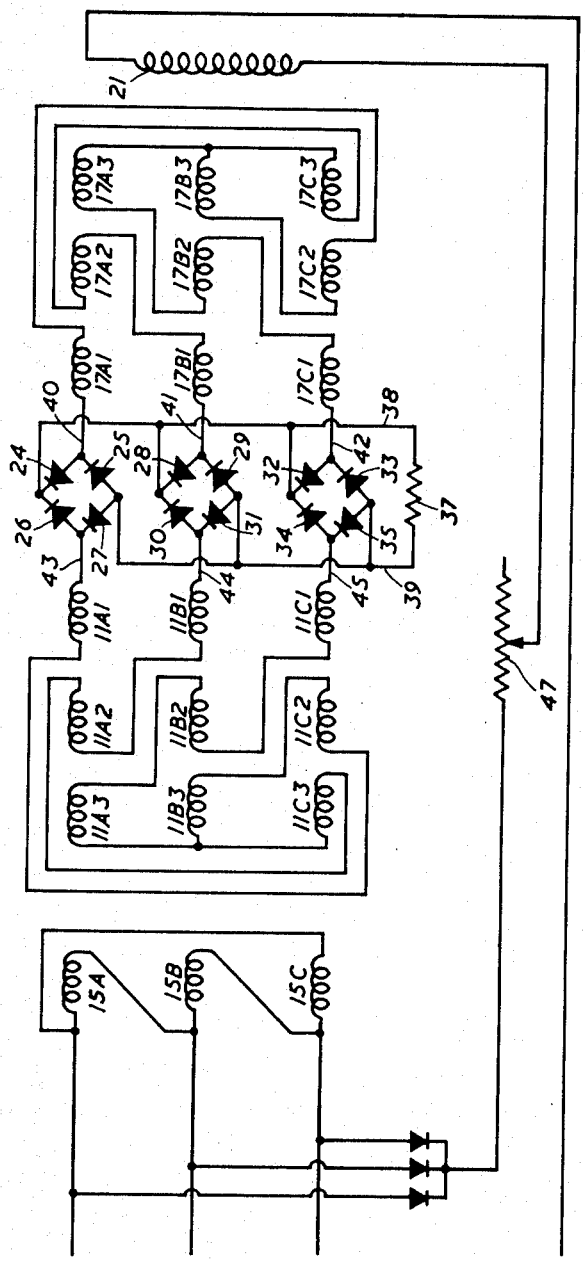
Figure 6:
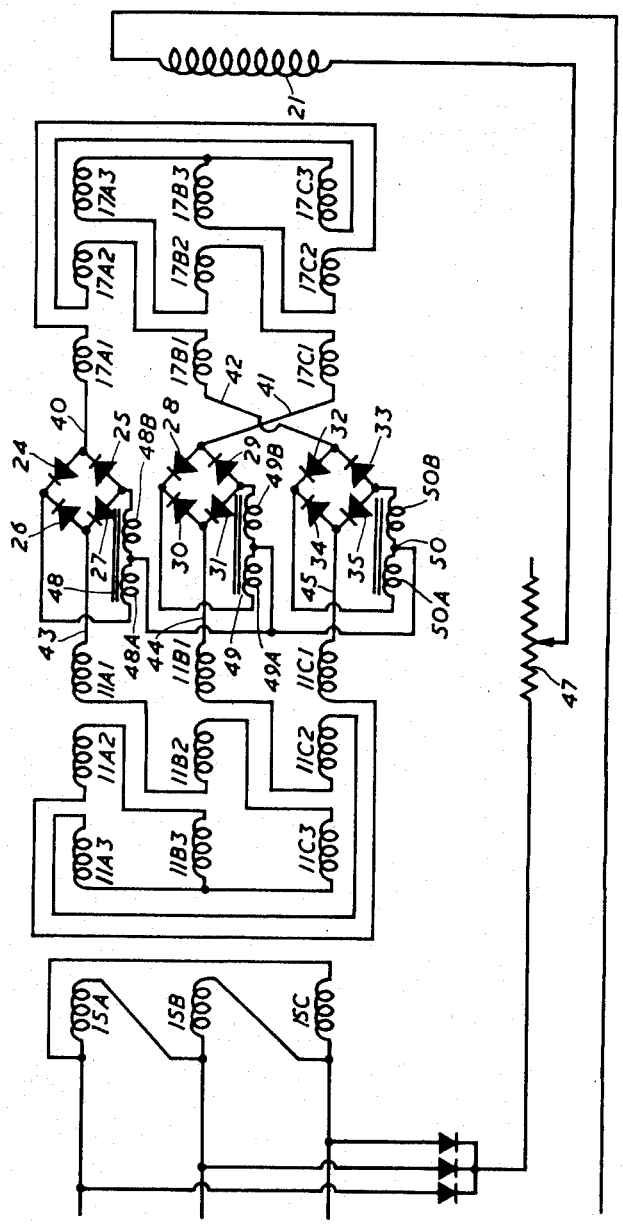

For a better understanding of the invention reference will be made to the accompanying drawings in which:

FIGURE 1 schematically illustrates a particular embodiment of an electric motor, FIGURE 2 is a part section on the line II—II of FIGURE 1, FIGURE 3 is a first embodiment of a circuit diagram of the motor of FIGURES 1 and 2, FIGURE 4 is a vector diagram illustrating the voltage relationships in the rotor of a polyphase induction motor, FIGURE 5 is a schematic circuit diagram of a modified form of the electrical wiring associated with the motor of FIGURES 1 and 2, and FIGURE 6 illustrates a further modified wiring diagram of the motor in accordance with the invention.

Referring now particularly to FIGURES 1 and 2 the motor includes a hollow casing 1 which is of cylindrical form and which is provided with end plates 2, held in place by bolts 3 of which only two are shown. The end plates 2 are adapted so as to provide bearings 4 and 5 for a rotor shaft 6, one end of the shaft 6 extending outwardly of one of the end plates 2 so as to provide the output shaft of the motor. The bearings 4 and 5 for the shaft 6 can be ball or rollers journal bearings. The shaft 6 carries two axially separated rotors 7 and 8 which are arranged to co-operate with stators 9 and 10 which are fixedly secured to the casing 1.

The rotor 7 includes a set of three phase A.C. motor rotor windings 11 which are wound on a laminated core 12, the core 12 being held on the shaft 6 with the aid of clamp rings 13 and 14. The stator 9 includes a set of three-phase A.C. motor stator windings 15 which are wound on a laminated stator core 16 secured to the internal wall of the casing 1.

The rotor 8 includes a set of three-phase A.C. generator windings 17 which are wound on a laminated core 18 which is securely attached to the shaft 6. The laminations of the core 18 are held in place by clamp rings 19 and 20. The rotor 8 may have a larger number of turns than the rotor 7, and thus a higher resistance. The stator 10 includes a single coil stator winding 21 which is wound on a laminated core 22 secured to the internal wall of the casing 1. The winding 21 is disposed so as to provide as many pole pairs as may be required to suit the desired range of speed control attainable by the rheostat 47.

An annular plate 23 is securely attached to and rotatable with the shaft 6. The plate 23 serves as a support for a rectifier assembly including 12 rectifiers which are arranged in two rings of six rectifiers each. The rectifiers being identified by the reference numerals 24 to 35.

The positive poles or connections of the rectifiers 24, 26, 38, 30, 32 and 34 are connected together by a conductor ring 36 which has an arm 38 connected to one end of a resistance element 37. The resistance element 37 is conveniently of annular form and is securely mounted via arms 39 of the conductor ring 36 on to the plate 23. The negative poles or connections of the rectifiers 25, 27, 29, 31, 33 and 35 are connected together by a conductor 39 and to the opposite end of the resistance element 37.

One end of each of the three-phase rotor windings 17 are connected together to form a star point connection for the complete rotor winding assembly. The opposite ends of these rotor windings are connected via insulated conductors 40, 41 and 42 to the rectifiers 24 and 25, 28 and 29, 32 and 33 respectively. Similarly one end of each of the three-phase rotor windings 11 of the rotor 7 are connected together to form a further star point for the complete rotor winding assembly of the rotor 7 and the opposite ends of these rotor windings are connected by insulated conductors 43, 44 and 45 to the rectifiers 26 and 27, 30 and 31, and 34 and 35.

FIGURE 3 illustrates in schematic form the circuit diagram associated with the motor embodiment shown in FIGURES 1 and 2. For convenience of reference those parts of the circuit of FIGURE 3 which are the same as those which have been described in relation to FIGURES 1 and 2 will receive the same reference numerals. In addition the phases of the three-phase windings 11, 15 and 17 will be identified by the suffixes A, B and C, thus for example the rotor windings 11 and 17 have phase windings 11A, 11B and 11C and 17A, 17B and 17C respectively. Similarly, the stator winding has phase windings 15A, 15B and 15C.

The stator winding 15 is energised from a polyphase supply. The supply is also connected via field rectifiers 46 to one terminal of a field rheostat 47. The variable tap of the latter being connected to one end of the stator winding 21 whose other end is connected to neutral. It will be noted that the rotor assembly does not involve any brush gear, slip rings or the like.

The operation of the hereinbefore described motor is as follows:

A polyphase alternating current supply is connected to the polyphase stator winding 15 and the motor runs as a normal induction motor at a fixed speed appropriate to the characteristics of the windings 11 and 15 and the resistance of the rectifiers 24–35 included in the network.

A.D.C. supply which is obtained from the polyphase supply via the rectifiers 46 is applied to the single field winding 21 via the rheostat 47 hence the high resistance rotor 8 with its polyphase winding 17 running within the field of this stator winding 21 will generate in the winding 17 an oppositely directed electromotive force of a magnitude appropriate to the strength of the magnetic flux produced by the field winding 21 and the speed of rotation. This electromotive force will pass through the rectifier networks 24–35 and will oppose the electromotive force generated by the polyphase rotor winding 11. This action will tend to reduce the current flowing in the main rotor windings 11 and the speed of the rotor shaft will fall, thereby increasing the slip and increasing the electromotive force generated in the main rotor 7. The fall in speed of the main rotor 7 will produce a decrease in the magnitude of the electromotive force generated. The motor will run at a speed at which the electromotive force generated in the main rotor windings 11 will exceed that generated in the second rotor windings 17 by an amount sufficient to cause the required main motor current to circulate through the combined impedance of both rotor windings 11 and 17, the rectifiers 24–35 and the resistance 37.

In a further modified form of the electrical circuitry of the motor in accordance with the invention a high torque at low speeds may be obtained without the inclusion of an unduly great amount of resistance in the rotor circuit by advancing the phase of the voltage applied to each rotor winding 11A, 11B, 11C and 17A, 17B, 17C by approximately 45°. This advance of the phase by 45° is achieved by adding to the induced voltage in each rotor phase winding a proportion of the voltages induced in the other phase windings of the same rotor winding 11 or 17.

This problem of advancing the phase of each rotor winding by substantially 45° in front of the voltage induced in the winding will be considered in relation to FIGURE 4 which is a vectorial representation of the voltages VR1, VR2 and VR3 of phases 1, 2 and 3 respectively induced in the rotor of a three-phase induction motor having rotor windings R1, R2 and R3. It will be seen from the vector diagram that by the addition to phase 1 of approximately 58%, that is to say, $$\frac{1}{2 \cos 30}$$

of the voltage induced in the phase 2 with reversed polarity with respect to phase 2 and approximately 58% of the voltage induced in phase 3 with the same polarity as phase 3. The resultant vector VR11 which represents the voltage applied to the phase 1 so that rotor winding is advanced by 45° ahead of the vector VR1. The vectors VR21 and VR31 represent the voltages applied to phases 2 and 3, when similar percentages of the voltage factors of the other phases of the rotor winding have been added thereto. A convenient method of effecting this addition of the 58% of the phases in the other windings to any one winding can be effected by dividing each of the phase windings into three parts. This is shown in FIGURE 5 of the drawings.

It will be seen from FIGURE 5 that each phase winding 11A, 11B, 11C, 17A, 17B, 17C of the rotor windings 11 and 17 respectively are divided into three separate parts. For convenience of reference the parts are identified as follows:

Rotor phase winding 11A is divided into the parts 11A1, 11A2 and 11A3; phase winding 11B is divided into parts 11B1, 11B2 and 11B3; phase winding 11C is divided in parts 11C1, 11C2 and 11C3; phase winding 17A is divided into parts 17A1, 17A2 and 17A3; phase winding 17B is divided into parts 17B1, 17B2 and 17B3 and phase winding 17C is divided into three parts 17C1, 17C2 and 17C3. In each case the division of each phase winding is such that one part constitutes the major part of the winding and the other two parts each have approximately 58% of the turns of the major part.

The major part of each rotor winding phase is connected in series with a minor part of each one of the other two phases of the rotor winding. The series connections are such that one of the minor windings is arranged to be of the opposite sense to that of the two windings with which it is series connected. The choice of which winding is reversed in practice, determines the direction in which the rotor develops the maximum torque at standstill.

In the particular arrangement in FIGURE 5 it will be seen that the series connections between the phase winding parts are as follows: In the case of rotor winding 11, 11A1, 11C2 and 11B3; 11B1, 11A2 and 11C3; 11C1, 11B2 and 11A3. In the case of the rotor winding 17 the series connections are as follows: 17A1, 17C2 and 17B3; 17B1, 17A2 and 17C3; 17C1, 17B2 and 17A3. It will be appreciated that the phase of the current which flows in each rotor winding 11 is largely dependent upon the phase of the voltage applied to that particular winding. From which it follows that the phase of the current flow in each rotor winding will also be advanced by 45° in sympathy with the voltages and will lie in approximately the same phase relationship to the rotating magnetic flux induced in the rotor winding 11 respectively as is obtained when the total resistance in the rotor circuit is made approximately equal to the reactance, thereby to attain the conditions for high torque at low speed. In other words a desirable high low speed torque can be developed without the addition of an excessive amount of pure resistance into the rotor circuit of the motor. Consequently the resistive power loss in the rotor circuit is substantially reduced. It will be appreciated that a further reduction of the resistance in the rotor circuit will tend to reduce the power loss in the form of heat introduced into the rotor circuit. As will be seen from FIGURE 6 the resistance 37 is replaced by chokes or inductances 48, 49 and 50.

The chokes inductances 48, 49 and 50 cannot be connected into the rotor circuit in direct replacement for the resistance 37 since the current at that part of the rotor circuit is in D.C. form and inductances would be electrically ineffective. In these circumstances the chokes or inductances 48, 49 and 50 are connected across the pairs D.C. terminal of each rectifier network associated with the windings 11A, 17A, 11B, 17B, 11C and 17C respectively. Each choke or inductance includes a split winding the halves of which are wound in the same sense with respect to each other, the windings being wound on a common soft iron core. For convenience of reference, the windings halves will be identified as 48A, 48B for the inductance 48; 49A, 49B for the inductance 49; and 50A and 50B for the inductance 50. Each pair of windings 48A, 48B; 49A, 49B; or 50A, 50B are connected together and also to the same point of all of the other inductances associated with the other rectifier networks. Since the directions of winding of each pair of windings 48A, 48B; 49A, 49B; and 50A, 50B are in the same sense it will be appreciated that an alternating magnetic flux will be introduced into the associated core from alternate half-wave current pulses from the positive and negative poles of the associated rectifier network. In this manner in each half cycle the flow of alternating current from each rectifier network will be opposed by the back E.M.F. generated in the inductance whereby the power loss due to the resistance in the rotor circuit into which the inductance is connected will be confined to the resistance loss of the inductance windings and the rotor windings. In view of the use of the chokes or inductances 48, 49 and 50 it is necessary to have the inputs to the rectifiers in phase. In the circumstances one set of rotor winding connections are crossed-over.

The inductances are conveniently mounted rigidly onto the rotor assembly so that they rotate with the rotor. Conveniently these inductances can be mounted on a plate similar to the plate 23 which used to carry the rectifiers.

If desired, the rectifiers and/or the inductances can be positioned intermediate of the rotor assemblies 7 and 8 instead of being located at one end of the rotor shaft 6.

As a further alternative to the resistance 37 it is possible to provide an additional full wave rectifier network which is connected between the star points of the rotor windings 11 and 17. It will be found necessary to provide a resistance in the connection between each star point and the associated output point of the terminal.

In this latter case there will be one rectifier network per phase and one further network in the star point, all rectifiers being mounted securely on the rotor assembly, i.e. on the plate 23.

The speed of the motor may be controlled down to the point where the core of the generator windings is saturated.

The speed of the motor can be controlled in a variety of ways.

One convenient method is by the illustrated rheostat 47 or by variable resistance inserted in series with a polyphase rectifier, connected to the supply to the main stator winding, and the field winding 21. Other methods could employ a separate source of direct current, grid controlled rectifiers or silicon controlled rectifiers.

What I claim is:

1. A motor including a first stator unit comprising polyphase induction motor winding and a second stator unit having a single winding, and means for energising the single winding with a direct voltage the units being axially spaced with respect to each other and a rotor having two polyphase windings located one beside the other and positioned so as to be co-operable with the stator windings, one end of each phase winding of each rotor winding being star connected and the remaining ends of the phase windings of each rotor winding being connected to a full wave rectifier network, the connections with the full wave rectifier network being such that each phase winding of one polyphase rotor winding is connected to the opposite terminal of the rectifier network to which the corresponding phase of the other polyphase rotor winding has been connected, and wherein the outputs of all the rectifier networks are connected across a load.

2. A motor including a rotor assembly including two axially spaced apart polyphase rotor windings and a polyphase stator winding for one rotor winding, and a single winding for the other stator winding which is intended to be energised with direct voltage, wherein one end of each phase winding of each rotor winding is star connected with the corresponding end of the other phase windings of the rotor, whilst the remaining ends of the phase windings are connected to a rectifier arrangements including a full wave rectifier network for each phase, and wherein the outputs of all the rectifier networks are connected across a load.

3. A motor as claimed in claim 1, wherein each phase winding of each rotor is divided into three parts, which parts are so connected in series that each part of each phase winding is series connected with one of the parts of the phase winding of each of the other two phases, and wherein the relative proportions of said parts and the sense of the windings in the three series connections being such that maximum torque is developed in the rotor at standstill conditions.

4. A motor as claimed in claim 1, wherein each phase winding of each rotor is divided into three parts a major part and two similar minor parts and wherein for each phase one of said parts constitutes a major part of the phase winding and each of the other two parts comprises substantially 58% of the turns of the major part, said parts being so connected in series that the major part of one phase is connected in series with one minor part of the adjacent second phase following in rotation, and this in turn is connected in series with one minor part of the third phase also following in series, the series connections being further such that one of the minor parts is arranged to be of the opposite sense to that of the other two parts with which it is connected.

5. A motor as claimed in claim 1, wherein the load is constituted by an arrangement of bifilar windings chokes or inductances connected across the positive and negative terminals of the rectifier networks.

6. A motor as claimed in claim 5, wherein each choke or inductance includes a split winding whose two portions are wound in the same sense on a common core, one portion being connected to the positive pole of the associated rectifier network and the other portion being connected to the negative pole of the associated network, and wherein the junction points of each split windings of each choke or inductance associated with each phase are connected together.

7. A motor as claimed in claim 1, wherein a field rectifier arrangement is arranged to produce from the polyphase voltage current applied to the polyphase stator winding a direct voltage for the single winding.

8. A motor as claimed in claim 7, wherein the magnitude of the direct voltage is controllable by a field rheostat or the like.

References Cited by the Examiner

UNITED STATES PATENTS 2,497,141 2/50 Schultz _____ 310—68.4
2,970,249 1/61 Mazur _____ 318—97

FOREIGN PATENTS 1,216,369 11/58 France.

JOHN F. COUCH, *Primary Examiner.*

MILTON O. HIRSHFIELD, ORIS L. RADER,
*Examiners.*